United States Patent Office 3,442,885
Patented May 6, 1969

3,442,885
BICYCLIC AMIDINE-COPPER SALT CATALYZED POLYARYLENE ETHER FORMATION
Horst Wieden, Dormagen, Ulrich Bahr, Opladen-Lutzenkirchen, and Gunther Nischk, Dormagen, Germany, assignors to Farbenfabriken Bayer Aktiengesellschaft, Leverkusen, Germany, a corporation of Germany
No Drawing. Filed Mar. 17, 1967, Ser. No. 623,813
Claims priority, application Germany, Mar. 24, 1966, F 48,751
Int. Cl. C08g 23/18
U.S. Cl. 260—47         8 Claims

ABSTRACT OF THE DISCLOSURE

Process for the production of polyarylene ethers in inert solvents from 2,6-disubstituted phenols by oxidative coupling with oxygen, characterized in that the oxidative coupling is carried out in the presence of a catalyst system of copper salts and bicyclic amidines of the general formula

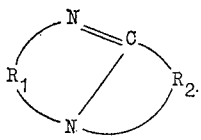

wherein $R_1$ denotes an alkylene radical having 2–4 carbon atoms and $R_2$ is an alkylene radical which may contain a further tertiary nitrogen atom.

---

This invention relates to a process for the preparation of polyarylene ethers from 2,6-disubstituted phenols by oxidative coupling using oxygen.

It is already known that 2,6-disubstituted phenols can be reacted to form polyarylene ethers in inert solvents with oxygen in the presence of a catalyst system consisting of copper salts and tertiary amines, preferably pyridine derivatives. In order to obtain high molecular weight products, however, a large molar excess of the tertiary amine is necessary. Catalyst mixtures for obtaining polyarylene ethers which have been described in the literature, for example, contain about 100 moles of pyridine per mol of copper salt. Polyarylene ethers prepared in this way contain nitrogen in quantities of 0.1 to 0.5% by weight. Stability and colour of these polymers are affected thereby in an undesirable manner. Furthermore, the process is rendered much less economical since the quantity of catalyst is usually greater than the quantity of the 2,6-disubstituted phenol which is to be oxidised. If the oxidative coupling of 2,6-disubstituted phenols is carried out, however, in the presence of catalyst mixtures with a molar ratio of copper salt to pyridine of 1:10 or less, 3,5,3′,5′-tetra-substituted diphenoquinone as the main product is obtained. Furthermore, it was found that 2,6-disubstituted phenols undergo oxidative coupling in inert solvents to produce polyarylene ethers by using a catalyst system of copper salts and primary or secondary amines.

It has now been found that high molecular weight polyarylene ethers of the following general formula

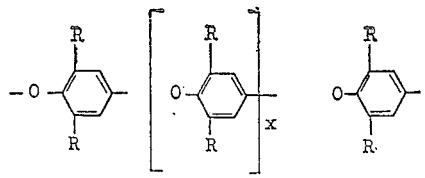

wherein R denotes a lower alkyl radical and $x$ an integer, can be prepared in high yields in inert solvents from 2,6-disubstituted phenols by oxidative coupling with a catalyst system of copper salts and bicyclic amidines of the following general formula:

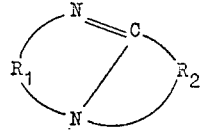

$R_1$ denotes an alkylene radical containing 2 to 4 carbon atoms and $R_2$ an alkylene radical which may contain a further tertiary nitrogen atom.

Examples of these amidines are, for example, bicyclic amidines of the following formulae:

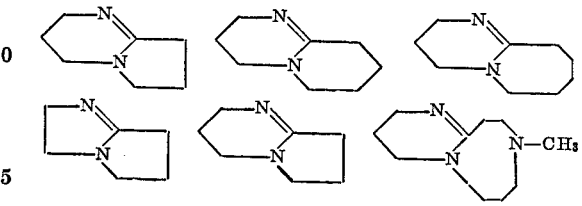

Examples of 2,6-disubstituted phenols suitable for use in the oxidative coupling are 2,6-dimethylphenol and 2,6-diethylphenol and mixtures thereof.

To carry out the process of invention, the catalyst system consisting of copper salt and bicyclic amidine is dissolved or partly dissolved and partly suspended in an inert solvent. Then the 2,6-disubstituted phenol is added to the catalyst solution and the oxidative coupling to form the polyarylene ether is carried out by introducing oxygen into the reaction solution. The exothermic reaction causes a considerable rise in temperature in the reaction solution. The end of the reaction is indicated by a drop in the reaction temperature. It is advisable to continue the introduction of oxygen for some time thereafter to make sure that the reaction is completed. In order to obtain high molecular weight products, the oxidative coupling should be carried out at temperatures between 15 and 60° C.; therefore in some cases it is advisable to add only a part of the 2,6-disubstituted phenol to the reaction solution. The residual amount is added in portions during the processing of the reaction, or to adjust the reaction temperature to a particular level by means of a thermostat. Furthermore, it is advantageous to trap the water set free in the oxidative coupling to form polyaryl ethers by addition of water binding agents such as $MgSO_4$ or $Na_2SO_4$. The resulting polyarylene ethers are isolated by precipitating their solutions into acidified nonsolvents. The solid materials are separated for further purification. Solvents for carrying out the reaction are systems which dissolve the polyarylene ethers, for example aromatic and araliphatic hydrocarbon, preferably benzene. Furthermore, a small proportion of this solvent may be replaced by ketones or alcohols without significantly disturbing the process.

The components used for the catalyst mixture are bicyclic amidines already mentioned above and copper salts of hydrochloric acid, hydrobromic acid, sulphuric acid, nitric acid, and aliphatic carboxylic acids such as acetic acid. Cuprous chloride is preferred. In order to obtain high molecular weight polyarylene ethers, the molar ratio of copper to phenol in the reaction solution may be varied within wide limits. Molar ratios of between 1:40 and 1:250 are preferred. The molar ratio of copper to bicyclic amidine, on the other hand, should generally not be greater than 1:10 and preferably should lie between 1:2 and 1:3, since at higher copper:amidine ratios the quality of the crude polymers is usually impaired. It is not essential to use pure oxygen when carrying out the oxidative coupling of the 2,6-disubstituted phenols; mixtures of oxygen with inert gases may be used also in the form of, for example, air or mixtures of oxygen with noble gas.

The polyarylene ethers prepared according to the invention are distinguished by their desirable mechanical, thermal and electrical properties. They can be worked up into moulded articles by the injection moulding process and foils, filaments and coatings can be produced from their solutions.

The following examples illustrate more specifically the invention.

Examples 1–6

30 parts by weight of anhydrous magnesium sulphate and, as catalyst, the desired quantity of anhydrous cuprous chloride and bicyclic amidine in the molar ratio of about 1:2 are introduced into 500 parts by volume of anhydrous benzene in a 4-necked flask equipped with stirrer, thermometer, reflux condenser and gas inlet tube. After the addition of 50 parts by weight of 2,6-dimethyl-phenol, dry oxygen is introduced into the stirred reaction solution at a temperature of 23° C. upwards. The temperature at first rises and may reach about 40° C. depending on the catalyst mixture, catalyst quantity and velocity of flow of the stream of oxygen. To complete the oxidative coupling, introduction of oxygen is continued for 30 minutes after lowering of the reaction temperature.

The polyarylene ether produced is precipitated by pouring the reaction mixture into 1000 parts by volume of methanol and 10 parts by volume of concentrated hydrochloric acid. The precipitated product is filtered off, washed with methanol and freed from salts adhering to it by washing it with water (see Table I).

magnesium sulphate, 1.35 parts by weight of bicyclic amidine of the formula

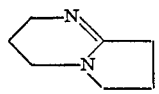

and the quantity of copper salt indicated in the table below. The molar ratio of 2,6-dimethyl-phenol to copper salt is in each case 82:1 and the molar ratio of copper salt to bicyclic amidine 1:2.2.

In order to isolate the resulting polyarylene ether, the solid constituents are removed from the reaction solution by filtration. About 600 parts by volume of benzene are then removed from the solution by distillation at reduced pressure. The polymer is precipitated by pouring the remaining solution into 1000 parts by volume of methanol and 10 parts by volume of concentrated hydrochloric acid, and is separated by filtration.

| Ex. | Copper salt Formula | Parts by weight | Reaction temperature, ° C. | Yield, parts by weight | $\eta_{rel}$ |
|---|---|---|---|---|---|
| 7 | $CuSO_4$ | 0.80 | 20–38 | 46.5 | 1.375 |
| 8 | $Cu(NO_3)_2.3H_2O$ | 1.20 | 20–32 | 44.5 | 1.410 |
| 9 | $CuCl_2.2H_2O$ | 0.85 | 20–30 | 39.8 | 1.370 |
| 10 | $Cu(CH_3COO)_2.H_2O$ | 1.00 | 20.32 | 45.4 | 1.480 |

Example 11

1000 parts by volume of anhydrous benzene, 0.5 parts by weight of anhydrous cuprous chloride, 1.55 parts by weight of the bicyclic amidine of the formula

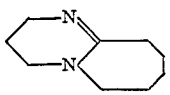

TABLE I

| Ex. | CuCl, parts by weight | Formula | Parts by weight | Highest reaction temperature, ° C. | Yield, parts by weight | $\eta_{rel}$ |
|---|---|---|---|---|---|---|
| 1 | 0.2 | (5-membered bicyclic amidine) | 0.50 | 40 | 47.1 | 4.02 |
| 2 | 0.5 | (6-membered bicyclic amidine) | 1.52 | 38 | 44.7 | 1.52 |
| 3 | 0.5 | (6-membered bicyclic amidine) | 1.55 | 40 | 48.2 | 2.40 |
| 4 | 0.2 | (bicyclic amidine) | 0.48 | 34 | 46.2 | 1.57 |
| 5 | 0.5 | (bicyclic amidine) | 1.52 | 41 | 45.6 | 2.17 |
| 6 | 0.5 | (bicyclic amidine with N—CH₃) | 1.84 | 33 | 43.1 | 1.45 |

The relative viscosity $\eta_{rel}$ was, in all examples, measured at 20° C. at a concentration of 1 g. of polyarylene ether in 100 ml. of chloroform.

Examples 7–10

Oxygen is passed in accordance with the instructions given in Examples 1–6 through a reaction mixture of 1000 parts by volume of benzene, 50 parts by weight of 2,6-dimethyl-phenol, 40 parts by weight of anhydrous and 50 parts by weight of 2,6-dimethyl-phenol are placed in the apparatus used in Examples 1–6.

(a) Oxygen is introduced with stirring at 22° C. The reaction temperature rises to 41° C. over about 2 hours. When the temperature has dropped again, the polyarylene ether is precipitated by pouring the reaction mixture into 1500 parts by volume of methanol and 10 parts by volume of concentrated hydrochloric acid.

Yield: 45.1 parts by weight; $\eta_{rel}$ 1.65.

(b) 30 parts by weight of magnesium sulphate are added to the reaction solution and the procedure described under 11 (a) is carried out. Residues of salt are washed out of the polymer with water.

Yield: 48.5 parts by weight; $\eta_{rel.}$ 3.602.

(c) 40 parts by weight of anhydrous sodium sulphate are added to the reaction solution and the procedure described under 11 (a) is carried out.

Yield: 45.8 parts by weight; $\eta_{rel.}$ 1.815.

(d) 30 parts by weight of magnesium sulphate are added to the reaction solution, and air is passed through for about 8 hours with stirring. The reaction temperature rises from 20 to 26° C. in about 3 hours. The polymer is isolated by the method described in Example 11 (a). Residues of salt are washed out with water.

Yield: 44.2 parts by weight; $\eta_{rel.}$ 2.76.

Example 12

Using the apparatus described in Examples 1–6, 0.2 part by weight of anhydrous cuprous chloride and 0.5 part by weight of the bicyclic amidine of the formula

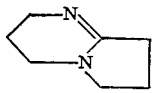

are (a) dissolved in 500 parts by volume of toluene. 50 parts by weight of 2,6-dimethylphenol are then added to the reaction solution and air is passed through the solution for 7 hours. The temperature rises from 22 to 32° C. during the reaction time.

The polyarylene ether is precipitated by pouring the reaction solution into 1000 parts by volume of methanol and 10 parts by volume of concentrated hydrochloric acid.

Yield: 40.5 parts by weight; $\eta_{rel.}$ 1.31.

(b) dissolved in 500 parts by volume of benzene. 50 parts by weight of 2,6-dimethylphenol are then added to the reaction solution and the reaction is from then on carried out using the procedure of 12 (a).

Yield: 42.1 parts by weight; $\eta_{rel.}$ 1.41.

Example 13

Using the apparatus described in Examples 1 to 6, 50 parts by weight of 2,6-diethylphenol and 40 parts by weight of anhydrous magnesium sulphate in 1000 parts by volume of benzene are gasified with oxygen for 3.5 hours, anhydrous cuprous chloride and the bicyclic amidine of the formula

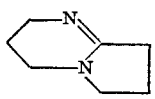

being used in the molar ratio of 1:2 or 2.2 as catalyst.

500 parts by volume of benzene are distilled off in vacuo and the polyarylene ether formed is precipitated from the remaining solution by pouring it into 1000 parts by volume of ethanol and 10 parts by volume of concentrated acid.

(a) 0.2 part by weight of cuprous chloride and 0.5 part by weight of amidine are used as catalyst. Reaction temperature 22–28° C.

Yield: 40.6 parts by weight; $\eta_{rel.}$ 1.41.

(b) 0.5 part by weight of cuprous chloride and 1.36 parts by weight of amidine are used as catalyst. Reaction temperature 22 to 32° C.

Yield: 43.1 parts by weight; $\eta_{rel.}$ 1.46.

What we claim is:

1. Process for the production of polyarylene ethers in inert solvents from 2,6-disubstituted phenols by oxidative coupling with oxygen, characterised in that the oxidative coupling is carried out in the presence of a catalyst system of copper salts and bicyclic amidines of the general formula

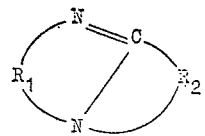

wherein $R_1$ denotes an alkylene radical having 2–4 carbon atoms and $R_2$ is an alkylene radical which may contain a further tertiary nitrogen atom, and in an inert organic solvent at temperatures between 15 and 60° C.

2. Process according to claim 1, characterized in that the catalyst contains the copper and bicyclic amidine in a molar ratio of 1:2 to 1:3.

3. The process of claim 1 wherein the bicyclic amidine has the formula

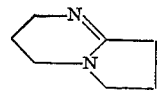

4. The process of claim 1 wherein the bicyclic amidine has the formula

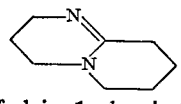

5. The process of claim 1 wherein the bicyclic amidine has the formula

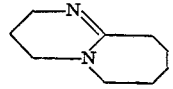

6. The process of claim 1 wherein the bicyclic amidine has the formula

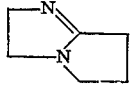

7. The process of claim 1 wherein the bicyclic amidine has the formula

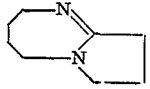

8. The process of claim 1 wherein the bicyclic amidine has the formula

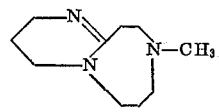

References Cited

UNITED STATES PATENTS 3,306,875 2/1967 Hay _____ 260—47
3,313,776 4/1967 Borman _____ 260—47

WILLIAM H. SHORT, *Primary Examiner.*

M. GOLDSTEIN, *Assistant Examiner.*